United States Patent
Ralph

(10) Patent No.: US 7,173,272 B2
(45) Date of Patent: Feb. 6, 2007

(54) QUANTUM OPTICAL CNOT GATE

(75) Inventor: Timothy Cameron Ralph, Queensland (AU)

(73) Assignee: The University of Queensland, Queensland (AU)

(*) Notice: Subject to any disclaimer, the term of this patent is extended or adjusted under 35 U.S.C. 154(b) by 349 days.

(21) Appl. No.: 10/487,024

(22) PCT Filed: Aug. 20, 2002

(86) PCT No.: PCT/AU02/01115

§ 371 (c)(1),
(2), (4) Date: Feb. 17, 2004

(87) PCT Pub. No.: WO03/019468

PCT Pub. Date: Mar. 6, 2003

(65) Prior Publication Data

US 2004/0252732 A1    Dec. 16, 2004

(30) Foreign Application Priority Data

Aug. 24, 2001 (AU) ..................... PR7269

(51) Int. Cl.
*H01L 29/06* (2006.01)
(52) U.S. Cl. .................. 257/13; 257/27; 257/431; 257/E21.089; 257/E29.168; 356/450; 356/521; 356/FOR. 107
(58) Field of Classification Search ............. None
See application file for complete search history.

(56) References Cited

OTHER PUBLICATIONS

Koashi et al., Probabilistic manipulation of entangled photons, Feb. 28, 2001, http://xxx.lanl.gov/PS_cache/quant-ph/pdf/0102/0102141.pdf.*

Ralph, et al., Simple Scheme for Efficient Linear Optics Quantum Gates, Aug. 18, 2001, http://xxx.lanl.gov/PS_cache/quant-ph/pdf/0108/0108049.pdf.*

Ralph, T.C. et al., "Linear Optical CNOT Gate in the Coincidence Basis", quant-ph/0112088, Dec. 17, 2001 (retrieved on Sep. 24, 2002 from internet) http://xxx.lanl.gov/abs/quant-ph/01112088.

Ralph, T.C. et al., "Simple Scheme for Efficient Linear Optics Quantum Gates", quant-ph/0108049, Aug. 20, 2001 (retrieved on Sep. 24, 2002 from internet) http://xxx.lanl.gov/abs/quant-ph/0108049.

Koashi, M. Et al., "Probabilistic Manipulation of Entangled Photons", quant-ph/0102141, Mar. 1, 2001 (retrieved on Sep. 24, 2002 from internet) http://xxx.lanl.gov/abs/quant-ph/0102141.

* cited by examiner

*Primary Examiner*—Leonardo Andujar
*Assistant Examiner*—Scott R. Wilson
(74) *Attorney, Agent, or Firm*—Wood, Phillips, Katz, Clark & Mortimer

(57) ABSTRACT

A nondeterministic quantum CNOT gate (10) for photon qubits, with success probability 1/9, uses beamsplitters (B1–B5) with selected reflectivities to mix control and target input modes. It may be combined with an atomic quantum memory to construct a deterministic CNOT gate, with applications in quantum computing and as a Bell-state analyser.

17 Claims, 2 Drawing Sheets

QUANTUM OPTICAL CNOT GATE

TECHNICAL FIELD

This invention concerns a non-deterministic quantum CNOT gate for photon qubits. It may be used in a deterministic CNOT gate. Such a deterministic CNOT gate would find many applications in Quantum Information Technology including as a Bell-state analyser and as a key element in an Optical Quantum Computer.

BACKGROUND ART

Classically, information can be encoded digitally by using a collection of systems which can each be placed in one of two distinct states, labelled as zeros and ones. Each system carries one "bit" of information. On the other hand quantum mechanics has systems that can be placed in states, called "superpositions", that exist simultaneously as zeros and ones. For example information could be encoded with single photons by labelling a horizontally polarized photon, |H>, as a one and a vertically polarized photon, |V>, as a zero. But a photon can also be in a superposition of these two states such as $1/\sqrt{2}(|H>+|V>)$. Such a state carries one "qubit" of quantum information [1]. Furthermore quantum systems can be "entangled". Entanglement refers to correlation between the measured properties of sub-systems that cannot be explained in terms of classical correlation.

These different properties of quantum information make new technologies possible, in particular "quantum cryptography" [2] which uses quantum information to distribute cryptographic keys with near perfect security and "quantum computing" [3] which utilizes the increased processing power of quantum information to dramatically reduce the time required for certain calculations. Whilst photons are easily manipulated at the single qubit level, long distance quantum cryptography and all quantum computing requires two qubit gates. Two qubit gates are not easily implemented in optics.

A key two qubit gate is the Controlled Not (CNOT) gate. It operates in the following way: One qubit is the "control" and the other qubit is the "target". The control qubit emerges from the gate in the same logical state as it entered. If the control qubit is in the logical zero state then the target qubit emerges with the same state as it entered. If the control qubit is in the logical one state then the target qubit emerges with the opposite state to that with which it entered the gate. If the control qubit is in a superposition state then the control and target qubits become entangled.

DISCLOSURE OF THE INVENTION

The invention is a non-deterministic quantum CNOT gate for photon qubits, comprising an interferometer to receive two target photon modes and two control photon modes and to cause a sign shift by splitting and remixing of the target photon modes, conditional on the presence of a photon in one particular control photon mode, so that the target photon qubit swaps modes if the control quantum qubit is in one mode but does not if the control photon qubit is in the other mode, provided a coincidence is measured between the control and target output photon modes.

The interferometer may comprise five beamsplitters. A first beamsplitter to receive two target photon modes. A second beamsplitter to receive one output mode from the first beamsplitter and a control photon mode, and to deliver a control output mode. A third beamsplitter to receive the other output mode from the first beamsplitter. A fourth beamsplitter to receive the outputs of the second and third beamsplitters and deliver the target output modes. And a fifth beamsplitter to receive the other control photon mode, and deliver the other control output mode. The beamsplitters are asymmetric in phase.

Reflection off the bottom of the first, third and fourth beamsplitters may produce sign change, but reflections off the top of the second and fifth beamsplitters may produce a sign change.

The first and fourth beamsplitters may both be 50:50 ($\eta=0.5$). The second, third and fourth beamsplitters may have equal reflectivities of one third ($\eta=0.33$).

The Heisenberg equations relating the control and target input modes to the their corresponding outputs may be:

$$c_{Ho} = \frac{1}{\sqrt{3}}(c_H + \sqrt{2}\, v_4) \quad (2)$$

$$c_{Vo} = \frac{1}{\sqrt{3}}(-c_V + \sqrt{2}\, t')$$

$$t_{Ho} = \frac{1}{\sqrt{2}}(t'' + t''')$$

$$t_{Vo} = \frac{1}{\sqrt{2}}(t'' - t''')$$

where:

$$t'' = \frac{1}{\sqrt{3}}(t' + \sqrt{2}\, c_V)$$

$$t''' = \frac{1}{\sqrt{6}}(t_H - t_v) + \sqrt{\frac{2}{3}}\, v_5$$

$$t' = \frac{1}{\sqrt{2}}(t_H + t_v)$$

By "non-deterministic" we mean it operates with a finite success probability. It is constructed from linear optics (as opposed to non-linear optics [4]) and is significantly simpler than previous suggestions [5].

When combined with verifiable quantum memory (VAM), the non-deterministic quantum CNOT gate may form a deterministic (that is it always works) CNOT gate using the teleportation protocol.

The general properties required of a VAM are as follows:
  (i) The quantum state of a photon can be transferred onto an atomic quantum state, held with minimal decoherence for some time and then reconverted to a photon quantum state efficiently.
  (ii) Probing of another atomic transition can verify that the photon qubit has been placed into memory.
  (iii) Joint measurements of the Bell type can be implemented between two qubits held in atomic memory.

The deterministic CNOT gate may also comprise two spontaneous down-converters to produce pairs of polarization entangled photons which are stored in four VAMs. Two of the photons are released and sent through the non-deterministic quantum CNOT gate and they are subsequently stored in two further VAMs. Polarization rotations are performed conditional on the results of the Bell measurements to achieve the required functionality.

In more detail, the photons in the second and third VAM may be released and sent through the non-deterministic quantum CNOT gate, and they are then stored in the two further VAMs. And the photons stored in the first, fifth, sixth and fourth VAMs are in the state required to implement the teleportation protocol [7].

The control and target photon qubits enter and may be stored in a seventh and eighth VAM. Bell measurements are made on the stored qubits in the first and seventh VAMs and on the eighth and fourth VAMs. The qubits in fifth and sixth VAMs are released. Polarization rotations of $\sigma_X = X$ and $\sigma_Z = Z$ are performed on the qubit released from the fifth VAM conditional on the results of the Bell measurements on the first and seventh VAMs and on the eighth and fourth VAMs as indicated in the figure. Similarly rotations are performed on the photon released from the sixth VAM dependent on the results of the Bell measurements.

BRIEF DESCRIPTION OF THE DRAWINGS

An example of the invention will now be described with reference to the accompanying drawings, in which.

BEST MODES OF THE INVENTION

1. Non-Deterministic Quantum CNOT Gate

Figure 1:
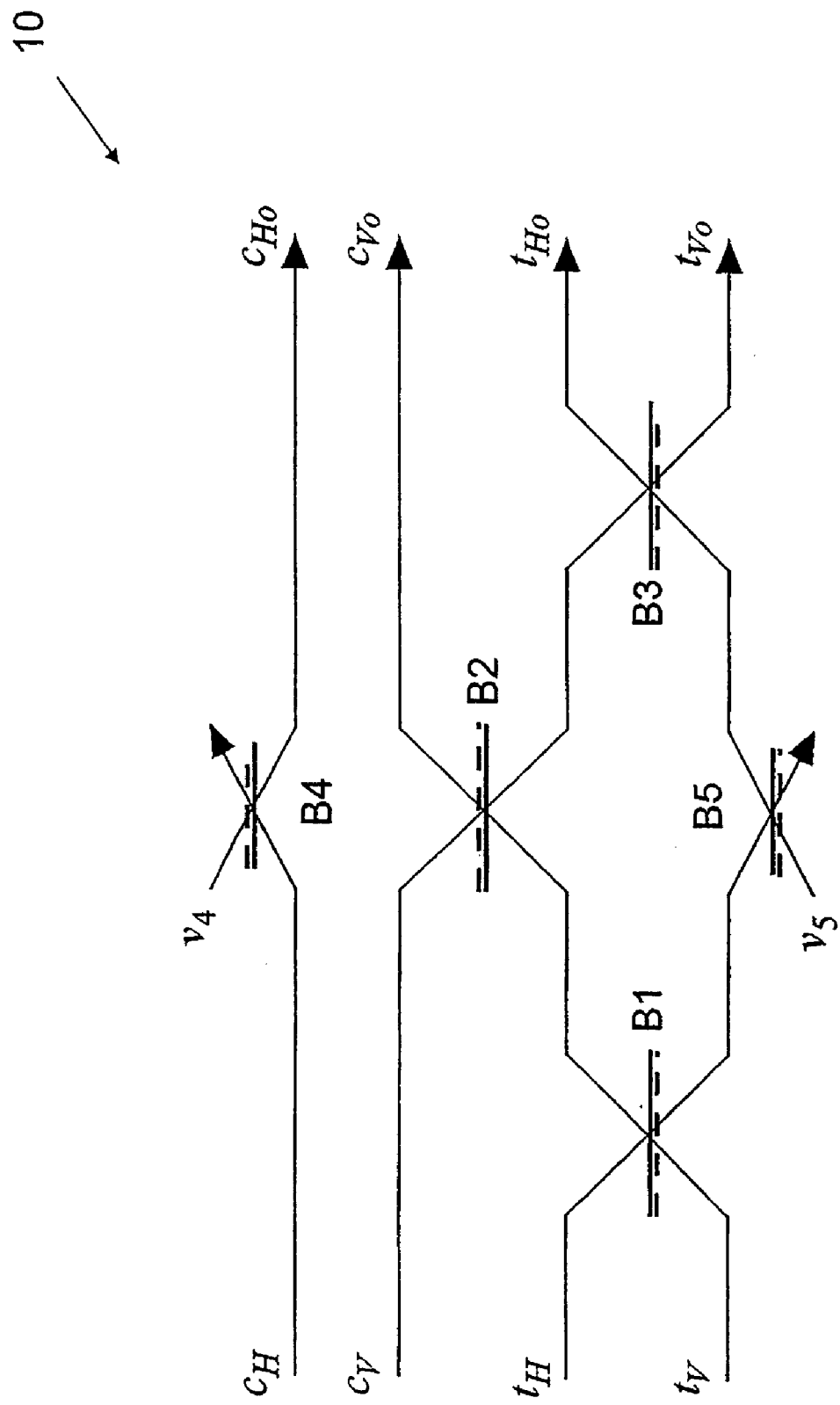
FIG. 1 is a schematic diagram of a non-deterministic quantum CNOT gate for photon qubits, where dashing indicates the surface from which a sign change occurs upon reflection.

Referring first to FIG. 1, the non-deterministic quantum CNOT gate 10 comprises five beamsplitters, B1, B2, B3, B4, and B5 which are all assumed asymmetric in phase. That is, it is assumed that the operator input/output relations (the Heisenberg equations) between two input mode operators ($a_{in}$ and $b_{in}$) and the corresponding output operators ($a_{out}$ and $b_{out}$) for the beamsplitters have the general form:

$$a_{out} = \sqrt{\eta}\, a_{in} + \sqrt{1-\eta}\, b_{in} \quad (1)$$
$$b_{out} = \sqrt{1-\eta}\, a_{in} - \sqrt{\eta}\, b_{in}$$

where $\eta$ ($1-\eta$) is the reflectivity (transmitivity) of the beamsplitter. Reflection off the bottom produces the sign change except for B2 and B4 which have a sign change by reflection off the top. This phase convention simplifies the algebra but other phase relationships will work equally well in practice. Beamsplitters B1 and B3 are both 50:50 ($\eta=0.5$). The beamsplitters B2, B4 and B5 have equal reflectivities of one third ($\eta=0.33$).

We employ dual rail logic such that the "control in" qubit is represented by the two bosonic mode operators $c_H$ and $c_V$. A single photon occupation of $c_H$ with $c_V$ in a vacuum state will be our logical 0, which we will write $|H\rangle$ (to avoid confusion with the vacuum state). Whilst a single photon occupation of $c_V$ with $c_H$ in a vacuum state will be our logical 1, which we will write $|V\rangle$. Superposition states can also be formed via beamsplitter interactions. Similarly the "target in" is represented by the bosonic mode operators $t_H$ and $t_V$ with the same interpretations as for the control.

The Heisenberg equations relating the control and target input modes to their corresponding outputs are $$c_{Ho} = \frac{1}{\sqrt{3}}(c_H + \sqrt{2}\, v_4) \quad (2)$$

$$c_{Vo} = \frac{1}{\sqrt{3}}(-c_V + \sqrt{2}\, t')$$

$$t_{Ho} = \frac{1}{\sqrt{2}}(t'' + t''')$$

$$t_{Vo} = \frac{1}{\sqrt{2}}(t'' - t''')$$

where:

$$t'' = \frac{1}{\sqrt{3}}(t' + \sqrt{2}\, c_v)$$

$$t''' = \frac{1}{\sqrt{6}}(t_H - t_v) + \sqrt{\frac{2}{3}}\, v_5$$

$$t' = \frac{1}{\sqrt{2}}(t_H + t_v)$$

The gate operates by causing a sign shift in the interferometer formed by the splitting and remixing of the target modes, conditional on the presence of a photon in the $c_V$ mode. Thus the target modes swap if the control is in the state $|V\rangle_c$ but do not if the control is in state $|H\rangle_c$. This is always true when a coincidence (photons are detected at the same time) is measured between the control and target outputs. However such coincidences only occur one ninth of the time, on average. The other eight ninths of the time either the target or the control or both do not contain a photon. This can be seen explicitly by calculating coincident expectation values from Eqs 2. If the initial state is $|H\rangle_c |H\rangle_t$ then we find $$\langle c^\dagger_{Ho} c_{Ho} t^\dagger_{Ho} t_{Ho} \rangle = \frac{1}{9} \quad (3)$$

$$\langle c^\dagger_{Ho} c_{Ho} t^\dagger_{Vo} t_{Vo} \rangle = 0$$

$$\langle c^\dagger_{Vo} c_{Vo} t^\dagger_{Vo} t_{Vo} \rangle = 0$$

$$\langle c^\dagger_{Vo} c_{Vo} t^\dagger_{Ho} t_{Ho} \rangle = 0$$

and for initial state $|H\rangle_c |V\rangle_t$ we find $$\langle c^\dagger_{Ho} c_{Ho} t^\dagger_{Vo} t_{Vo} \rangle = \frac{1}{9} \quad (4)$$

with all other expectation values zero, but for initial state $|V\rangle_c |H\rangle_t$ we find $$\langle c^\dagger_{Vo} c_{Vo} t^\dagger_{Vo} t_{Vo} \rangle = \frac{1}{9} \quad (5)$$

with all other expectation values zero, and for initial state $|V\rangle_c|V\rangle_t$ we find $$\langle c^\dagger_{VO} c_{VO} t^\dagger_{HO} t_{HO} \rangle = \frac{1}{9} \quad (6)$$

with all other expectation values zero. To confirm experimentally that the gate operates correctly requires only direct detection of the photon outputs. For some applications this may be sufficient. However to produce a deterministic CNOT gate from the invention requires the non-destructive determination of whether a control and target photon are both present. This is discussed in the following section.

2. Deterministic CNOT Gate

In order to use the invention to build a deterministic CNOT gate a verifiable atomic quantum memory (VAM) is required, such as that proposed from current technology [6].

The general properties required of a VAM are as follows:
(i) The quantum state of a photon can be transferred onto an atomic quantum state, held with minimal decoherence for some time and then reconverted to a photon quantum state efficiently.
(ii) Probing of another atomic transition can verify that the photon qubit has been placed into memory.
(iii) Joint measurements of the Bell type [1] can be implemented between two qubits held in atomic memory.

Figure 2:
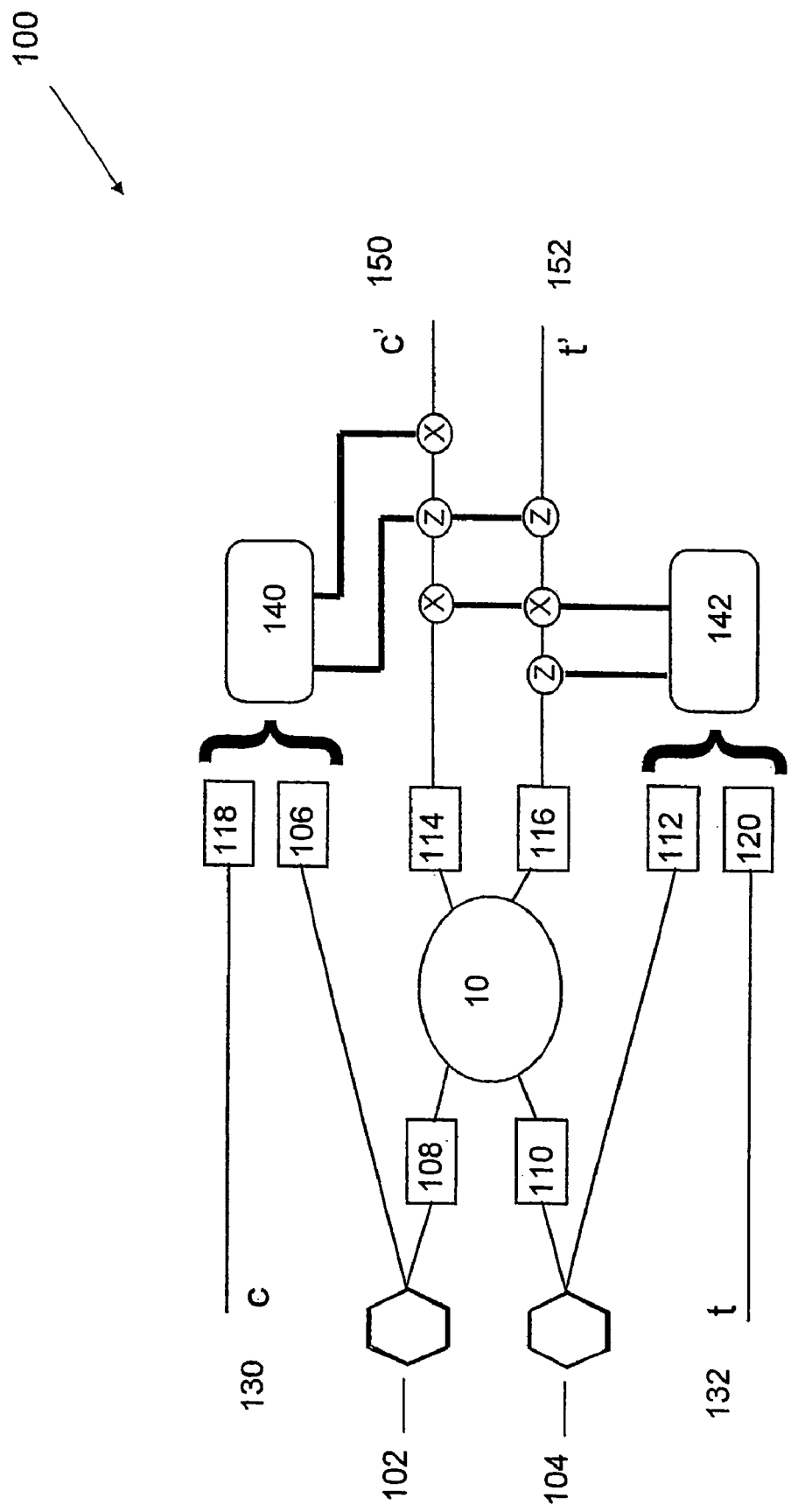
FIG. 2 is a schematic diagram of a deterministic CNOT gate.

In principle Ref. [6] satisfies all these criteria. If VAMs with the properties described above are coupled with the non-deterministic quantum CNOT gate 10 then a deterministic CNOT gate can be constructed using the teleportation protocol described in Ref. [7]. A deterministic CNOT gate 100 is shown in FIG. 2 and is described in the following:

(1) Entanglement Preparation: Two spontaneous down-converters, 102 and 104, (established technology [8]) produce pairs of polarization entangled photons which are stored in $VAM_1$ 106, $VAM_2$ 108, $VAM_3$ 110, and $VAM_4$ 112, respectively. The photons in $VAM_2$ 108, and $VAM_3$ 110, are released and sent through the non-deterministic quantum CNOT gate 10, and an attempt to store them in $VAM_5$ 114, and $VAM_6$ 116, is made. Most of the time storage of photons in $VAM_5$ 114, and $VAM_6$ 116, will not be verified (because the invention is non-deterministic) at which point the photons in $VAM_1$ 106 and $VAM_4$ 112, are dumped and the process is started again. However, on average one in nine attempts will be successful and the photons stored in $VAM_1$ 106, $VAM_5$ 114, $VAM_6$ 116, and $VAM_4$ 112, are in the state required to implement the teleportation protocol [7].

(2) Implementing the Gate: The photon qubits, c 130, and t 132, enter and are stored in $VAM_7$ 118, and $VAM_8$ 120 respectively. Bell measurements 140, 142 are made on the stored qubits in $VAM_1$ 106, and $VAM_7$ 118, and on $VAM_8$ 120, and $VAM_4$ 112 respectively. The qubits in $VAM_5$ 114, and $VAM_6$ 116, are released. Polarization rotations of $\sigma_x \equiv X$ and $\sigma_z \equiv Z$ (established technology) are performed on the qubit released from $VAM_5$ 114 conditional on the results of the Bell measurements 140, 142, on $VAM_1$ 106, and $VAM_7$ 118, and on $VAM_8$ 120, and $VAM_4$ 112, as indicated in FIG. 2. Similarly rotations are performed on the photon released from $VAM_6$ 116, are dependent on the results of the Bell measurements 140 and 142.

This completes the protocol as the output qubits, c' 150, and t' 152, are now the original qubits with a CNOT applied.

REFERENCES

[1] C. H. Bennett and D. P. DiVincenzo, Nature 404, 247 (2000).
[2] C. H. Bennett, et al, Phys Rev Lett 70, 1895 (1993).
[3] R. P. Feynman, Foundations Phys. 16, 507 (1986); D. Deutsch, Proc.Roy.Soc.London A400, 97 (1985).
[4] G. J. Milburn, Phys Rev Lett 62, 2124 (1988).
[5] E. Knill, R. Laflamme and G. J. Milburn, Nature 409, 46, (2001).
[6] J. H. Shapiro, LANL preprint quant-ph/0105055 (2001).
[7] D. Gottesman and I. L. Chuang, Nature 402, 390 (1999).
[8] P. G. Kwiat, K. Mattle, H. Weinfurter and A. Zeilinger, Phys Rev Lett 75, 4337 (1995).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A non-deterministic quantum CNOT gate for photon qubits, comprising an interferometer to receive two target photon modes and two control photon modes and two unoccupied ancilla modes and to cause a sign shift by splitting and remixing of the target photon modes, conditional on the presence of a photon in one particular control photon mode, so that the target photon qubit swaps modes if the control quantum qubit is in one mode but does not if the control photon qubit is in the other mode, provided a coincidence is measured between the control and target output photon modes.

2. A non-deterministic quantum CNOT gate according to claim 1, where the interferometer comprises five beamsplitters: a first beamsplitter to receive two target photon modes, a second beamsplitter to receive one output mode from the first beamsplitter and a control photon mode, and to deliver a control output mode, a third beamsplitter to receive the other output mode from the first beamsplitter, a fourth beamsplitter to receive the outputs of the second and third beamsplitters and deliver the target output modes, and a fifth beamsplitter to receive the other control photon mode, and deliver the other control output mode.

3. A non-deterministic quantum CNOT gate according to claim 2, where the beamsplitters are asymmetric in phase, reflection off the bottom of the first, third and fourth beamsplitters produce sign change, but reflections off the top of the second and fifth beamsplitters produce a sign change.

4. A non-deterministic quantum CNOT gate according to claim 3, where the first and fourth beamsplitters are both 50:50 ($\eta$=0.5), and the second, third and fourth beamsplitters have equal reflectivities of one third ($\eta$=0.33).

5. A non-deterministic quantum CNOT gate according to claim 2, where the first and fourth beamsplitters are both 50:50 ($\eta$=0.5), and the second, third and fourth beamsplitters have equal reflectivities of one third ($\eta$=0.33).

6. A non-deterministic quantum CNOT gate according to claim 2, 3, 5 or 4 where the Heisenberg equations relating the control and target input modes to the their corresponding outputs are:

$$c_{Ho} = \frac{1}{\sqrt{3}}(c_H + \sqrt{2}\ v_4)$$

-continued $$c_{V_o} = \frac{1}{\sqrt{3}}(-c_V + \sqrt{2}\ t')$$

$$t_{H_o} = \frac{1}{\sqrt{2}}(t'' + t''')$$

$$t_{V_o} = \frac{1}{\sqrt{2}}(t'' - t''')$$

where:

$$t'' = \frac{1}{\sqrt{3}}(t' + \sqrt{2}\ c_v)$$

$$t''' = \frac{1}{\sqrt{6}}(t_H - t_v) + \sqrt{\frac{2}{3}}\ v_5$$

$$t' = \frac{1}{\sqrt{2}}(t_H + t_v).$$

7. A deterministic CNOT gate comprising a non-deterministic quantum CNOT gate according to claim 1, and further comprising two spontaneous down-converters to produce pairs of polarization entangled photons which are stored in first, second, third and fourth verifiable quantum memorys (VAMs), where two of the stored photons are released and sent though the non-deterministic quantum CNOT gate and are subsequently stored in fifth and sixth VAMs, and polarization rotations are performed conditional on the results of Bell measurements to achieve the required functionality.

8. A deterministic CNOT gate according to claim 7, where photons in the second and third VAM are released and sent though the non-deterministic quantum CNOT gate, and they are then stored in the fifth and sixth VAMs, and the photons stored in the first, fifth, sixth and fourth VAMs are in the state required to implement the teleportation protocol.

9. A deterministic CNOT gate according to claim 8, where control and target photon qubits enter and are stored in a seventh and eighth VAM, Bell measurements are made on the qubits stored in the first and seventh VAMs and on the eighth and fourth VAMs, qubits in fifth and sixth VAMs are released, polarization rotations of $\sigma$hd X≡X and $\sigma_z$≡Z are performed on the qubit released from the fifth VAM conditional on the results of the Bell measurements on the first and seventh VAMs and on the eighth and fourth VAMs, and similarly, rotations are performed on the photon released from the sixth VAM dependent on the results of the Bell measurements.

10. A non-deterministic quantum CNOT gate for photon qubits, comprising an interferometer to receive two target photon modes and two control photon modes and to cause a sign shift by splitting and remixing of the target photon modes, conditional on the presence of a photon in one particular control photon mode, so that the target photon qubit swaps modes if the control quantum qubit is in one mode but does not if the control photon qubit is in the other mode, provided a coincidence is measured between the control and target output photon modes, where the interferometer comprises five beamsplitters: a first beamsplitter to receive two target photon modes, a second beamsplitter to receive one output mode from the first beamsplitter and a control photon mode, and to deliver a control output mode, a third beamsplitter to receive the other output mode from the first beamsplitter, a fourth beamsplitter to receive the outputs of the second and third beamsplitters and deliver the target output modes, and a fifth beamsplitter to receive the other control photon mode, and deliver the other control output mode.

11. A non-deterministic quantum CNOT gate according to claim 10, where the beamsplitters are asymmetric in phase, reflection off the bottom of the first, third and fourth beamsplitters produce sign change, but reflections off the top of the second and fifth beamsplitters produce a sign change.

12. A non-deterministic quantum CNOT gate according to claim 11, where the first and fourth beamsplitters are both 50:50 ($\eta$=0.5), and the second, third and fourth beamsplitters have equal reflectivities of one third ($\eta$=0.33).

13. A non-deterministic quantum CNOT gate according to claim 10, where the first and fourth beamsplitters are both 50:50 ($\eta$=0.5), and the second, third and fourth beamsplitters have equal reflectivities of one third ($\eta$=0.33).

14. A non-deterministic quantum CNOT gate according to claim 10 where the Heisenberg equations relating the control and target input modes to the their corresponding outputs are:

$$c_{H_o} = \frac{1}{\sqrt{3}}(c_H + \sqrt{2}\ v_4)$$

$$c_{V_o} = \frac{1}{\sqrt{3}}(-c_V + \sqrt{2}\ t')$$

$$t_{H_o} = \frac{1}{\sqrt{2}}(t'' + t''')$$

$$t_{V_o} = \frac{1}{\sqrt{2}}(t'' - t''')$$

where:

$$t'' = \frac{1}{\sqrt{3}}(t' + \sqrt{2}\ c_v)$$

$$t''' = \frac{1}{\sqrt{6}}(t_H - t_v) + \sqrt{\frac{2}{3}}\ v_5$$

$$t' = \frac{1}{\sqrt{2}}(t_H + t_v).$$

15. A deterministic CNOT gate comprising a non-deterministic quantum CNOT gate according to claim 10, and further comprising two spontaneous down-converters to produce pairs of polarization entangled photons which are stored in first, second, third and fourth verifiable quantum memorys (VAMs), where two of the stored photons are released and sent through the non-deterministic quantum CNOT gate and are subsequently stored in fifth and sixth VAMs, and polarization rotations are performed conditional on the results of Bell measurements to achieve the required functionality.

16. A deterministic CNOT gate according to claim 15, where photons in the second and third VAM are released and sent through the non-deterministic quantum CNOT gate, and they are then stored in the fifth and sixth VAMs, and the photons stored in the first, fifth, sixth and fourth VAMs are in the state required to implement the teleportation protocol.

17. A deterministic CNOT gate according to claim 16, where control and target photon qubits enter and are stored in a seventh and eighth VAM, Bell measurements are made on the qubits stored in the first and seventh VAMs and on the eighth and fourth VAMs, qubits in fifth and sixth VAMs are released, polarization rotations of $\sigma_X \equiv X$ and $\sigma_Z \equiv Z$ are performed on the qubit released from the fifth VAM conditional on the results of the Bell measurements on the first and seventh VAMs and on the eighth and fourth VAMs, and similarly, rotations are performed on the photon released from the sixth VAM dependent on the results of the Bell measurements.

* * * * *